United States Patent
Lao et al.

(10) Patent No.: US 11,093,813 B2
(45) Date of Patent: Aug. 17, 2021

(54) ANSWER TO QUESTION NEURAL NETWORKS

(71) Applicant: Google Inc., Mountain View, CA (US)

(72) Inventors: Ni Lao, Belmont, CA (US); Lukasz Mieczyslaw Kaiser, Mountain View, CA (US); Nitin Gupta, Sunnyvale, CA (US); Afroz Mohiuddin, San Jose, CA (US); Preyas Popat, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 959 days.

(21) Appl. No.: 15/787,615

(22) Filed: Oct. 18, 2017

(65) Prior Publication Data

US 2018/0114108 A1    Apr. 26, 2018

Related U.S. Application Data

(60) Provisional application No. 62/410,773, filed on Oct. 20, 2016.

(51) Int. Cl.
*G06N 5/04*    (2006.01)
*G06N 3/00*    (2006.01)
(Continued)

(52) U.S. Cl.
CPC .......... *G06N 3/006* (2013.01); *G06N 3/0445* (2013.01); *G06N 3/0454* (2013.01); *G06N 5/04* (2013.01); *G06N 3/084* (2013.01)

(58) Field of Classification Search
CPC .......................................................... G06N 5/00
(Continued)

(56) References Cited

U.S. PATENT DOCUMENTS 10,147,037 B1 *   12/2018   Podgorny .............. G06N 5/022
2005/0080625 A1 *  4/2005   Bennett ............. G06F 16/24522
                                                         704/249

(Continued)

OTHER PUBLICATIONS

'wikipedia.org' [online] "Beam Search," Last update: Jul. 16, 2017, [retrieved on Nov. 29, 2017] Retrieved from Internet: URL< https://en.wikipedia.org/wiki/Beam_search> 3 pages.
(Continued)

*Primary Examiner* — David R Vincent
(74) *Attorney, Agent, or Firm* — Middleton Reutlinger (57) ABSTRACT

Methods, systems, and apparatus, including computer programs encoded on computer storage media, for identifying answers to questions using neural networks. One of the methods includes receiving an input text passage and an input question string; processing the input text passage using an encoder neural network to generate a respective encoded representation for each passage token in the input text passage; at each time step: processing a decoder input using a decoder neural network to update the internal state of the decoder neural network; and processing the respective encoded representations and a preceding output of the decoder neural network using a matching vector neural network to generate a matching vector for the time step; and generating an answer score that indicates how well the input text passage answers a question posed by the input question string.

18 Claims, 5 Drawing Sheets

(51) Int. Cl.
*G06N 3/04* (2006.01)
*G06N 3/08* (2006.01)

(58) Field of Classification Search
USPC .................................................. 706/15, 45
See application file for complete search history.

(56) References Cited

U.S. PATENT DOCUMENTS

2007/0094285 A1* 4/2007 Agichtein ............. G06F 16/243
2016/0358072 A1* 12/2016 Hermann ............. G06N 3/0427

OTHER PUBLICATIONS

'www.wildml.com' [online] Attention and Memory in Deep Learning and NLP, Denny Britz, Jan. 3, 2016, [retrieved on Nov. 29, 2017] Retrieved from Internet: URL< http://www.wildml.com/2016/01/attention-and-memory-in-deep-learning-and-nlp/> 10 pages.

Bandanau et al. "Neural Machine Translation by Jointly Learning to Align and Translate," arXiv 1409.0473v7, May 19, 2016, 15 pages.
Sutskever et al. "Sequence to Sequence Learning with Neural Networks" Advances in neural information processing systems, 2014, 9 pages.
Wu et al. "Google's Neural Machine Translation System: Bridging the Gap between Human and Machine Translation," arXiv preprint arXiv 1609.08144, Oct. 8, 2016, 23 pages.
Written Opinion issued in International Application No. PCT/US2017/057251, dated Sep. 19, 2018, 7 pages.
Office Action and Search Report issued in British Application No. GB1717243.8, dated Mar. 20, 2018, 8 pages.
International Search Report and Written Opinion issued in International Application No. PT/US2017/057251, dated Apr. 9, 2018, 14 pages.
Yin et al. "Neural Generative Questions Answering," Proceedings of the Workshop on Human-Computer Questions Answering, Apr. 22, 2016, 12 pages.
International Preliminary Report on Patentability issued in International Application No. PCT/US2017/057251, dated Jan. 28, 2019, 17 pages.

* cited by examiner

ANSWER TO QUESTION NEURAL NETWORKS

CROSS-REFERENCE TO RELATED APPLICATION

This application claims priority to U.S. Provisional Application No. 62/410,773, filed on Oct. 20, 2016. The disclosure of the prior application is considered part of and is incorporated by reference in the disclosure of this application.

BACKGROUND

This specification relates to identifying answers to questions using neural networks.

Neural networks are machine learning models that employ one or more layers of models to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

In general, one innovative aspect of the subject matter described in this specification can be embodied in methods that include the actions of receiving an input passage and an input question string; and processing the input passage and the input question string using a neural network system to generate an answer score that indicates how well the input text passage answers the question posed by the input question string, wherein the neural network system includes an encoder neural network, a decoder neural network, and a matching vector neural network.

In general, another innovative aspect of the subject matter described in this specification can be embodied in methods that include the actions of receiving an input passage; and processing the input passage using a neural network system to generate an output question string that poses a question that is answered by the input passage, wherein the neural network system includes an encoder neural network, a decoder neural network, and a matching vector neural network.

Other embodiments of these aspects include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

Another innovative aspect of the subject matter described in this specification can be embodied in a computer system that includes an encoder neural network, a decoder neural network, a matching vector neural network. The encoder neural network is configured to receive an input text passage and to generate a respective encoded representation for each passage token in the input text passage. The decoder neural network is configured to, for each of a plurality of time steps, receive as input at least a preceding token in the input question string and a preceding internal state of the decoder neural network and to process the input to update the internal state of the decoder neural network and, optionally, generate a set of question token scores for the time step. The matching vector neural network is configured to, at each time step, receive the preceding internal state of the decoder neural network and the encoded representations and to generate a matching vector for the time step. The system also includes a subsystem that is configured to generate an answer score that indicates how well the input text passage answers the question posed by the input question string based at least on the matching vectors for the time step.

Other embodiments of this aspect include corresponding apparatus, and computer programs recorded on one or more computer storage devices, each configured to implement the computer system. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The subject matter described in this specification can be implemented in particular embodiments so as to realize one or more of the following advantages. An answer to question system can effectively generate an answer score that indicates how well a passage answers a given question. The answer to question system can also effectively generate a question that is answered by an input passage. By training the neural network-based components of the answer to question system as described in this specification, the answer to question system can not only effectively determine the best question for a given input passage, but can also effectively score input questions to reflect how well the input passage answers the input question, i.e., to discern bad answers from mediocre answers, mediocre answers from good answers, bad answers from good answers, and so on. The neural network can therefore be trained using given relationships between text inputs such that the neural network is then able to determine corresponding relationships based upon unseen input. Additionally, because the system is configured to and is trained to determine questions that are answered by a given passage rather than determining passages that answer a given question, the amount of data needed to train the system and that needs to be analyzed by the system to generate an output is greatly reduced. In particular, the system does not need to analyze a large body of electronic documents to generate an output and can instead analyze multiple questions, which tend to be shorter and more computationally efficient to process than electronic documents or passages extracted from electronic documents, against a single answer, rather than analyzing a single question against multiple answers, which are generally longer and less computationally efficient to process. In other words, because the system encodes a single relatively longer passage and can then score multiple relatively shorter possible questions rather than encoding a single short question and then scoring multiple relatively longer possible passages when generating an output, the system is much more computationally-efficient and can generate more accurate answer scores. In particular, a system according to embodiments is such that it may be effectively trained using a relatively small body of text.

The use of the answer to question system can improve the operation of the computer or computers on which the system is implemented. For example, because the answer to question system allows answer scores for input passage—input answer pairs to be effectively computed in advance, less compute time, bandwidth, battery use, and so on is required to determine appropriate answers to questions when the questions are actually posed. As a particular example, when a search query is received that has been classified as asking a question, a passage that effectively answers the question posed by the search query can be quickly identified and presented as part of the response to the search query. As another example, because the answer to question system allows answer scores for input passage—input question pairs to be determined without needing to use templates or other external data, the amount of computing resources needed to effectively determine the question score are reduced, i.e., the amount of processing resources and memory needed to determine the answer score are reduced. That is, because the described system scores an input passage—question pair without needing to take any other external data, e.g., templates, as input, the system can generate the scores using fewer computing resources.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
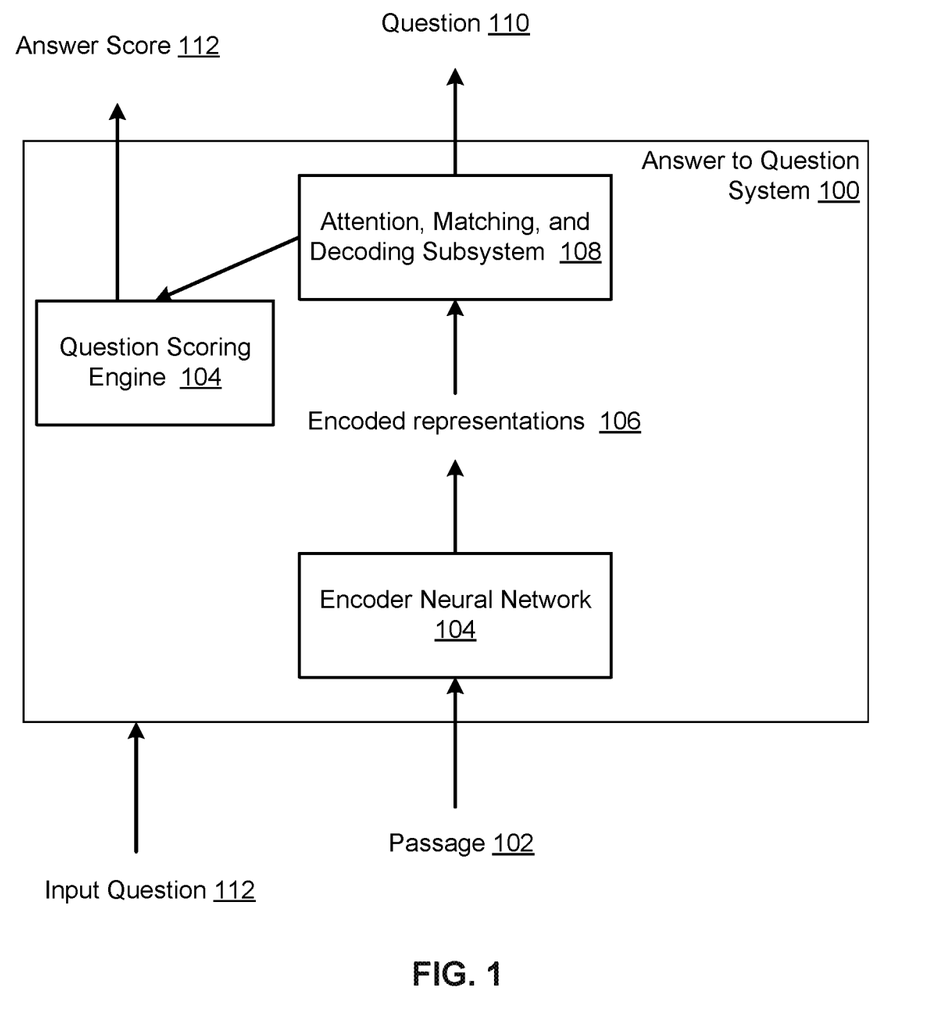
FIG. 1 shows an example answer to question system.

FIG. 1 shows an example answer to question system 100. The answer to question system 100 is an example of a system implemented as computer programs on one or more computers in one or more locations, in which the systems, components, and techniques described below can be implemented.

The answer to question system 100 can (i) receive an input text passage and generate a score for each of one or more input question strings that indicates how well the input text passage answers the question posed by the input question string or (ii) receive an input text passage and generate an output question string that is answered by the input text passage.

For example, the answer to question system 100 can obtain an input passage 102 and generate a corresponding question string 110 that is answered by the input passage 102. As another example, the answer to question system 100 can obtain an input passage 102 and an input question string 112 and generate a corresponding answer score 114 that indicates how well the input passage 102 answers the input question string 112. In other words, the answer score 114 indicates how well the input passage 102 satisfies the informational need of a user posing the input question string 112.

An input passage is a sequence of tokens, referred to in this specification as passage tokens, that each represent n-grams, i.e., characters, words, sub-words, and so on. For example, the passage 102 may be a phrase, a sentence, a paragraph, or another text segment extracted from a source document.

A question string is a sequence of tokens, referred to in this specification as question tokens, that each represent n-grams, such that the question string represents a natural language question or search query that explicitly or implicitly poses a question.

The answer to question system 100 includes an encoder neural network 104 and an attention, matching, and decoding subsystem 108.

The encoder neural network 104 processes a given input passage and generates a respective encoded representation for each passage token in the input passage, e.g., encoded representations 106 for the passage tokens in the input passage 102. The encoded representation for each passage token is a vector or other ordered collection of numeric values that represents the passage token (or the n-gram represented by the passage token) in the context of the input passage. Generally, the encoder neural network 104 is a recurrent neural network, e.g., a long short-term memory neural network (LSTM), that has been configured through training to generate the encoded representations. Example encoder recurrent neural networks that can be configured through training to generate appropriate encoded representations are described in Wu, Yonghui, et al, *Google's Neural Machine Translation System: Bridging the Gap between Human and Machine Translation*, available at https://arxiv.org/abs/1609.08144.

When the answer to question system 100 is generating a question score for an input question, the subsystem 108 receives the encoded representations 106 and the input question string 108 and generates a matching output that defines the answer score for the input question string 108 that indicates how well the input passage 102 answers the question posed by the input question string 108. A question scoring engine 104 in the answer to question system 100 then receives the matching output generated by the subsystem 108 and generates the answer score from at least the matching output. The operations performed by the subsystem 108 to generate a matching score are described in more detail below with reference to FIG. 2.

When the answer to question system 100 is generating an output question string, the subsystem 108 receives the encoded representations 106 and generates an output question string that is answered by the input passage 102. The operations performed by the subsystem 108 to generate a question string are described in more detail below with reference to FIG. 2.

Figure 2:
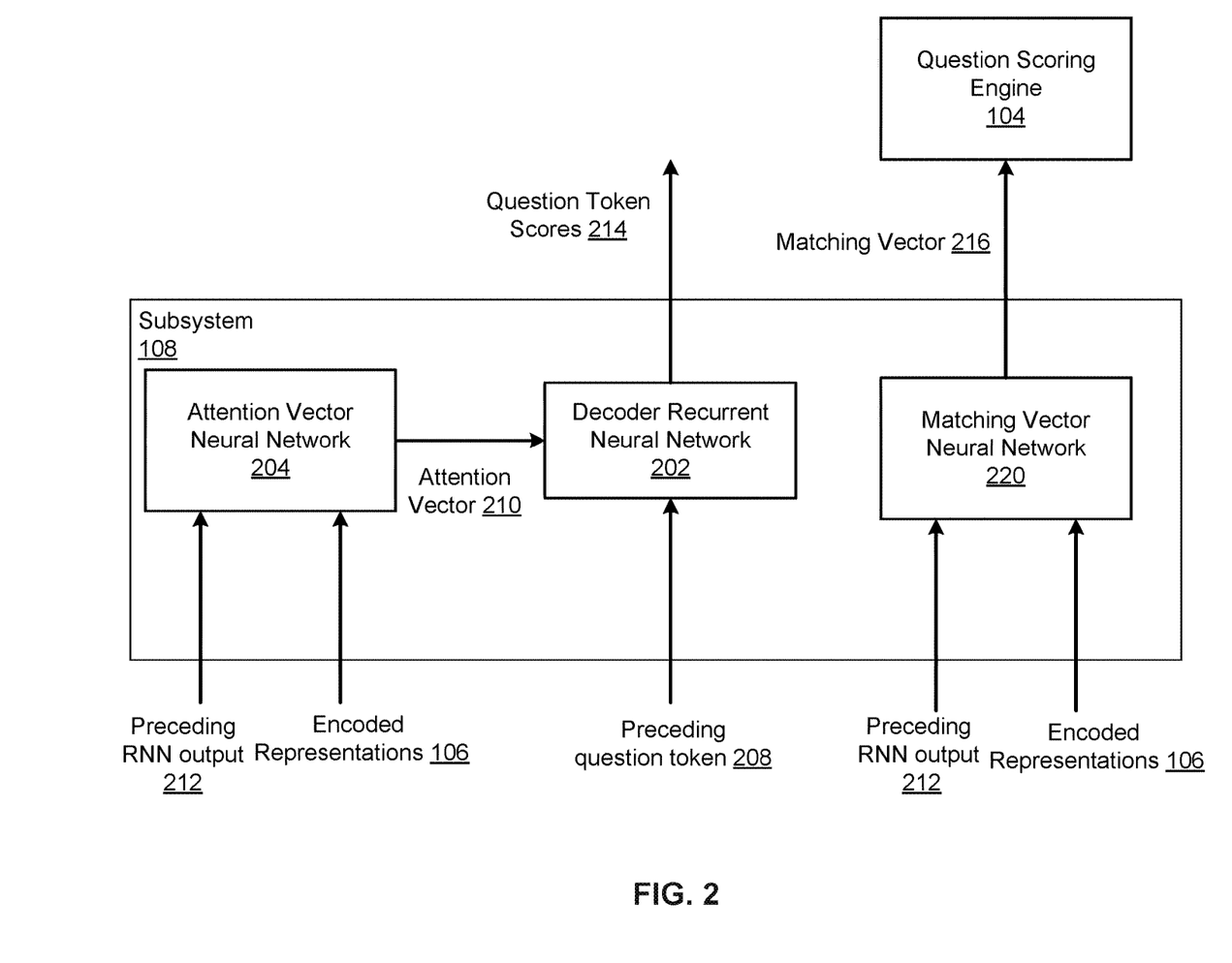
FIG. 2 shows an example attention, matching, and decoding subsystem.

FIG. 2 shows an example attention, matching, and decoding subsystem 108 as described above with reference to FIG. 1.

Generally, when generating an output question string, the subsystem 108 generates the output question string token by token, i.e., by outputting a respective set of question token scores 214 time step by time step until the output question string has been completed. Each set of question token scores is a score distribution over tokens in a vocabulary of tokens that may be included in an output question string. The vocabulary of tokens can include multiple tokens that each represent n-grams, i.e., characters, words, sub-words, and so on. The vocabulary of tokens also includes one or more special tokens, e.g., an end-of-sequence token, a start-of-sequence token, and so on.

The subsystem 108 includes a decoder Recurrent Neural Network (RNN) 202, an attention vector neural network 204, and a matching vector neural network 220.

The decoder RNN 202 is a recurrent neural network that receives an input sequence and maintains an internal state while processing the inputs in the input sequence. In particular, the RNN uses some or all of the internal hidden state of the network from processing a preceding input in the input sequence in combination with the preceding output in the output sequence to update the internal hidden state of the recurrent neural network and to generate a decoder output. In this case, the decoder RNN 202 has been configured to, for each time step, generate a decoder output that is a score distribution over tokens in the vocabulary of tokens that may be included in an output question string. Generally, the decoder RNN includes multiple recurrent neural network layers, e.g., multiple LSTM layers, and an output layer.

At each time step, the decoder RNN 202 receives as input a preceding question token 208 and an attention vector 210 generated by the attention vector neural network 204 for the time step and processes the preceding question token 208 and the preceding attention vector 210 to generate as output an updated hidden state of the decoder RNN for the time step, i.e., to update the internal hidden states of the recurrent layers, and a set of question token scores 214 that define a score distribution over the question tokens in the vocabulary of possible question tokens.

The token that is used as the preceding question token 208 for a given time step is dependent on the task that the answer to question system is currently performing.

When the task is to generate an output question string that is answered by the input passage, the preceding token is the question token that has been selected by the system as the question token at the immediately preceding time step in the output question string based on the question token scores generated at the preceding time step. Selecting a question token for a time step based on question token scores is described further below.

When the task is to generate a question score for an input question string, the preceding token is the question token that is in the input question string at the preceding time step. That is, in this task, the system generates question token scores for as many time steps as there are question tokens in the input question string, so that each question token in the input question string corresponds to a respective time step. For a given time step, the system selects the question token in the input question string that corresponds to the immediately preceding time step as the preceding question token.

In either task, for the first time step of decoding, the preceding question token is a predetermined start of sequence token.

To generate the attention vector 210 for the time step, the attention vector neural network 204 receives a preceding RNN output 216 and the encoded representations 106, i.e., the encoded representations of the passage 102 described above with reference to FIG. 1. The preceding RNN output 216 is an output generated by one of the layers of the decoder RNN during the processing for the preceding time step. For example, the preceding RNN output 216 may be the output of the last layer in the decoder RNN for the preceding time step or the output of the first layer in the decoder RNN for the preceding time step. Depending on the architecture of the decoder neural network, the preceding RNN output 216 may be the same as or different from the updated hidden state of the layer of the decoder RNN after the processing for the preceding time step.

The attention vector neural network 204 processes the preceding RNN output 216 of the decoder RNN 202 and the encoded representation 106 to generate as output the attention vector 210 for the time step. The attention vector 210 includes a respective attention value for each token in the input text passage.

An example architecture for the attention vector neural network 204 and the decoder RNN 202 and an example configuration for how the attention vector neural network 204 can be connected to the decoder RNN 202 are described in more detail in Wu, Yonghui, et al, *Google's Neural Machine Translation System: Bridging the Gap between Human and Machine Translation*, available at https://arxiv.org/abs/1609.08144.

In some cases, to generate an output sequence from the question token scores, for each time step, the system samples from the score distribution over the question tokens in the vocabulary or selects the highest-scoring question token as the question token in the output question string for the time step. The system continues to add question tokens to the output question string until an end-of-sequence token is selected or sampled.

In some other cases, the system maintains multiple partial output question strings using a left to right beam search decoding. For example, during inference, the system may maintain a beam, i.e., a set of partial hypotheses, i.e., partial output question strings. At each time step, each partial hypothesis in the beam may be expanded with every possible question token and only a predetermined number of likely beams are kept. When an end-of-sequence token is encountered, the partial hypothesis may be removed from the beam, i.e., the system stops adding additional outputs to the partial hypothesis, and added to the set of complete hypotheses. The system can repeat these steps until each partial hypothesis in the beam has been finalized. The system can then select the final hypothesis from the set of complete hypotheses having the highest sequence score as the hypothesis for the input passage or may output multiple of the finalized hypotheses as possible questions to be answered by the input passage. An example beam search technique is described in Wu, Yonghui, et al, *Google's Neural Machine Translation System: Bridging the Gap between Human and Machine Translation*, available at https://arxiv.org/abs/1609.08144.

The matching neural network 220 is used by the subsystem 108 when the task being performed is to evaluate how well the input passage answers the input question string. In particular, like the attention vector neural network 204, at each time step the matching vector neural network 220 also receives the preceding RNN output 216 and the encoded representations 106 and processes the preceding RNN output 216 and the encoded representations 106 to generate as output a matching vector 216 for the time step. Unlike the attention vectors, however, the matching vectors generated by the matching neural network 220 are not provided as input to the decoder vector RNN and are instead used by the question scoring engine 104

In some implementations, the matching vector neural network 220 has the same neural network architecture as the attention neural network 204. Thus, the matching vectors generated by the matching vector neural network 220 will have the same dimensionality as the attention vectors generated by the attention vector neural network 204, i.e., will also have a respective value/entry for each passage token in the input passage. However, because the attention vectors and the matching vectors are used for different purposes by the answer to question system when generating outputs, after training of the subsystem the values of the parameters of the matching vector neural network 220 will differ from those of the attention vector neural network 204. Accordingly, the matching vectors generated by the matching vector neural network 220 will differ from the attention vectors generated by the attention vector neural network 204.

In particular, the question scoring engine 104 generates the answer score for a given question from the matching vectors over all of the time steps for which the decoder RNN 202 generates an output while scoring the given question. In particular, the question scoring engine 104 can generate the answer score by combining the entries in the matching vectors over all of the time steps. For example, the question scoring engine 104 can compute an average of the entries in the matching vectors over all of the time steps, a weighted average of entries in the matching vectors over all of the time steps, e.g., with entries from later time steps being given greater weight, or a sum of entries in the matching vectors over all of the time steps.

In some implementations, the question scoring engine 104 also considers the perplexity for the tokens in the input question string as reflected by the question token scores generated by the decoder RNN 202. For example, the question scoring engine 104 can compute a perplexity score from an average perplexity of the tokens in the input question string as reflected by the scores generated by the decoder RNN 202 for the tokens and can combine, e.g., sum, average, or multiply, the perplexity score with the score determined from the matching vectors to generate the final answer score for the input question string.

Figure 3:
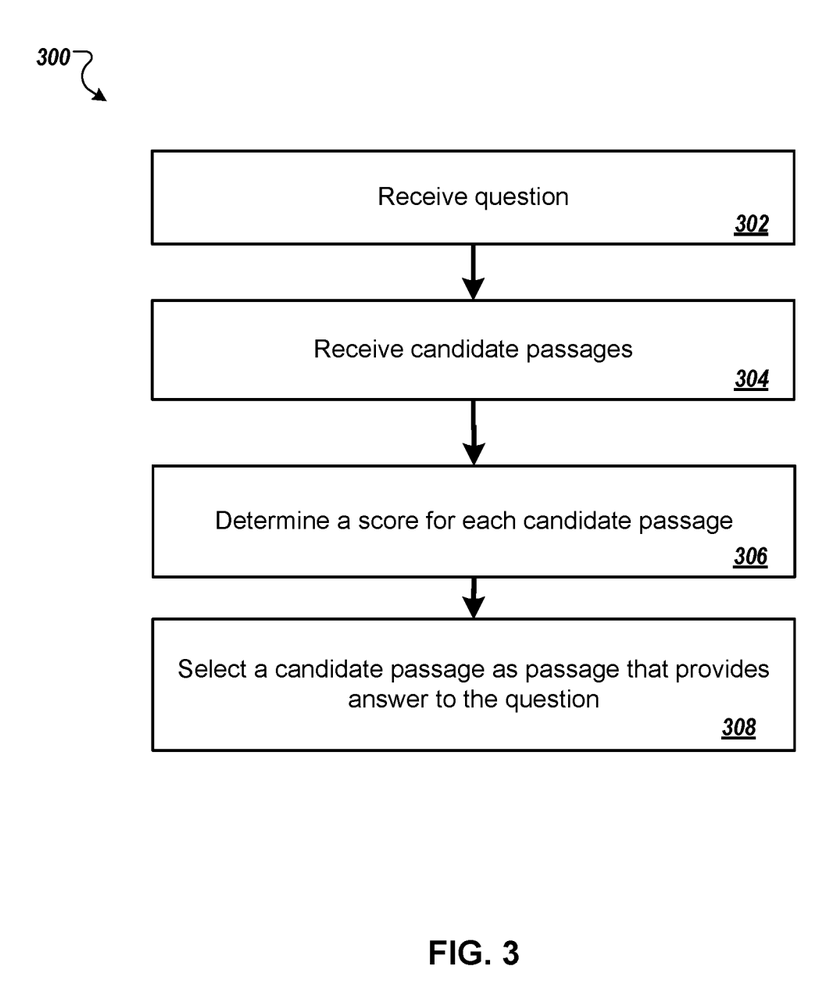
FIG. 3 is a flow diagram of an example process for selecting a passage that provides an answer to a question.

FIG. 3 is a flow diagram of an example process 300 for selecting a passage that provides an answer to a question. For convenience, the process 300 will be described as being performed by a system of one or more computers located in one or more locations.

The system receives a question (step 302). For example, the question may have been submitted as a search query to an Internet search engine.

The system receives candidate passages (step 304). For example, the candidate passages may have been extracted from resources identified by search results for the search query, e.g., a predetermined number of highest-ranked search results as determined by the Internet search engine.

The system determines a respective answer score for each candidate passage (step 306). The answer score for a given candidate passage indicates how well the candidate passage answers the question. In particular, to determine the answer scores, the system provides each candidate passage as input to the answer to question system along with a question string derived from the received question. The answer to question system processes the candidate passage and the question string to generate an answer score for the candidate passage as described above with reference to FIGS. 1 and 2.

In some implementations, the system has already pre-processed the candidate passages and the question string using the answer to question system and has stored the answer scores for the candidate passages. In these implementations, the system accesses the pre-computed answer scores from memory.

The system selects a candidate passage as the passage that provides the best answer to the question (step 308) using the answer scores for the candidate passages. For example, the system can select the highest-scoring candidate passage according to the answer scores or can combine the answer scores with scores generated based on other signals to generate a respective final answer score for each passage and can select the highest-scoring candidate passage according to the final answer scores.

In some implementations, the system outputs the selected candidate passage to a user as part of a response to the search query. For example, the system can provide the selected candidate passage for presentation to the user as part of a response to the search query, i.e., along with the search results for the search query. For example, the system can provide a formatted presentation of the passage that identifies the passage as an answer to the question along with a presentation of search results for the search query. As another example, the system can receive the question as a voice query and can verbalize all of or part of the selected candidate passage in response to the voice query, e.g., using a text-to-speech system.

Figure 4:
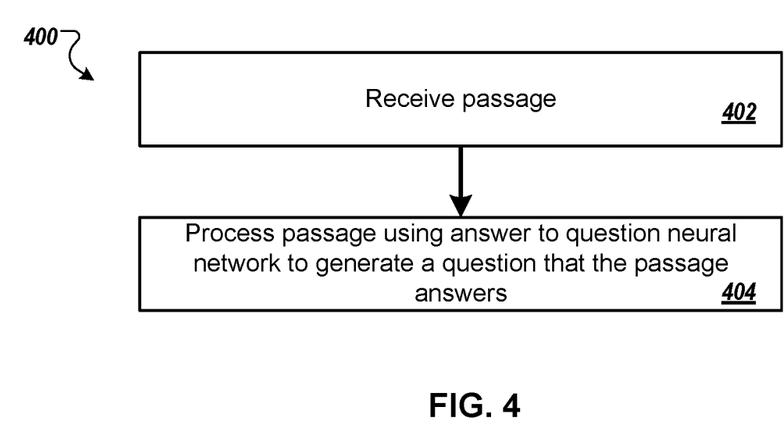
FIG. 4 is a flow diagram of an example process for generating a question that is answered by a passage.

FIG. 4 is a flow diagram of an example process 400 for generating a question that is answered by a passage. For convenience, the process 400 will be described as being performed by a system of one or more computers located in one or more locations.

The system receives an input passage (step 402).

The system processes the input passage using the answer to question system to generate an output question string that represents a question that is answered by the input passage (step 404), e.g., as described above with reference to FIGS. 1 and 2.

Figure 5:
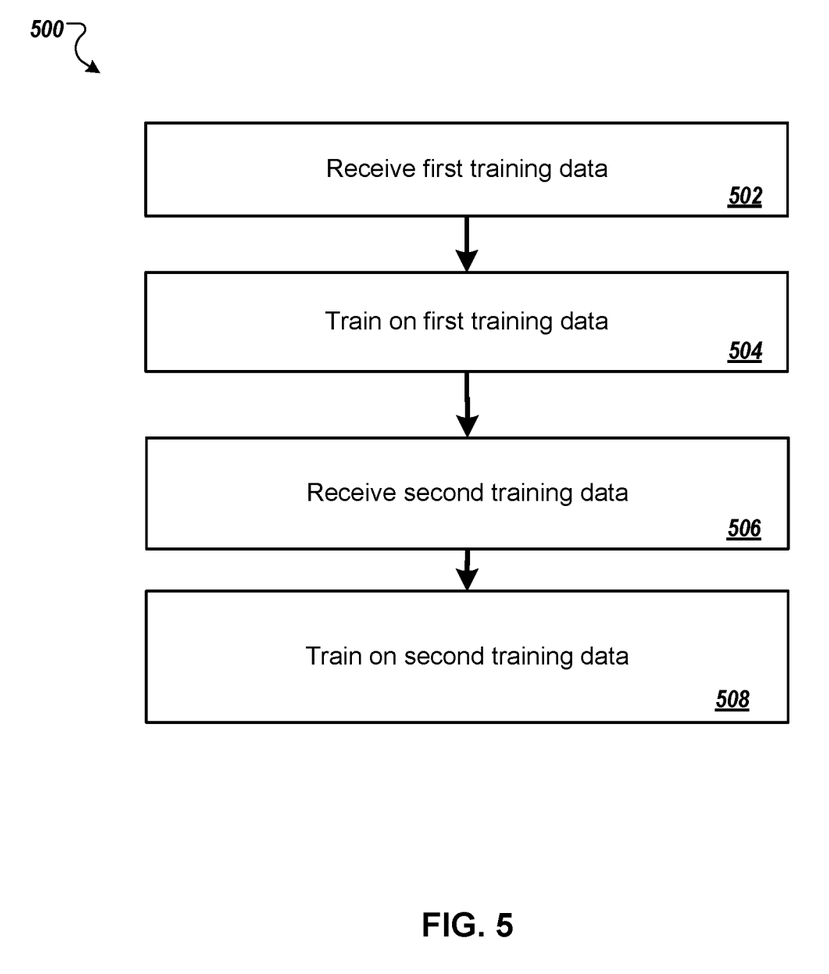
FIG. 5 is a flow diagram of an example process for training an encoder neural network and an attention, matching, and decoding subsystem.

FIG. 5 is a flow diagram of an example process 500 for training an encoder neural network and an attention, matching, and decoding subsystem. For convenience, the process 500 will be described as being performed by a system of one or more computers located in one or more locations. For example, an answer to question system, e.g., the answer to question system 100 of FIG. 1, appropriately programmed, can perform the process 500.

The system receives first training data for training the encoder neural network and the attention, matching, and decoding subsystem (step 502). The first training data includes multiple training passages and, for each training passage, a training question string for which the training passage has been determined to be a high-quality answer, and a training answer score for the training passage—training question string pair.

The system trains the encoder neural network and the attention, matching, and decoding subsystem on the first training data (step 504). In particular, the system trains the neural network and the subsystem on the first training data to minimize a loss function that is a weighted combination of (i) an average token perplexity loss function and (ii) a pseudo Huber loss function.

The average token perplexity loss function measures the average per token perplexity for the question tokens in the training question string as reflected by the corresponding question token scores generated by the decoder neural network during the processing of the corresponding question passage. That is, for each time step, the perplexity is measured based on the question token score generated by the decoder neural network for the question token in the training question string at that time step.

The pseudo Huber loss function measures the loss between the training answer score for the training passage—training question pair and the answer score generated by the question scoring engine for the training passage—training question pair, i.e., the score generated based on the matching vectors generated by the matching vector neural network.

As described above, in the first training data, each training passage or most of the training passages are associated with a training question for which the training passage has been determined to be a high-quality answer. Accordingly, while training on the first training data, the weight assigned to the average per token perplexity loss function is significantly greater than the weight assigned to the pseudo Huber loss function.

The system receives second training data (step 506) and trains the encoder neural network and the attention, matching, and decoding subsystem on the second training data (step 508). Like the first training data, the second training data also includes multiple training passages and, for each training passage, a training question and a training answer score for the training passage—training question pair. However, unlike the first training data, the second training data includes training passage—training question pairs that are of varying quality, i.e., some of the training passage are not good answers to the questions they are paired with (as reflected by the training score associated with the pair). Accordingly, so that the neural networks learn to discern between good answers and not-so-good or poor answers, while training on the second training data, the weight assigned to the average per token perplexity loss function is significantly reduced relative to the weight assigned to the pseudo Huber loss function.

The system can train the encoder neural network and the attention, matching, and decoding subsystem on the first and second training data using conventional machine learning training techniques, e.g., a backpropagation-through-time based training techniques. Once the encoder neural network and the attention, matching, and decoding subsystem have been trained to determine trained values of the parameters of the encoder neural network and the attention, matching, and decoding subsystem, the system can use the encoder neural network and the subsystem to accurately score input questions or to generate question strings for a given input passage.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
    receiving (i) an input text passage comprising a plurality of passage tokens and (ii) an input question string comprising a respective question token at each of a plurality of time steps;
    processing the input text passage using an encoder neural network, wherein the encoder neural network is configured to receive the input text passage and to process the input text passage to generate a respective encoded representation for each passage token in the input text passage;
    at each time step:
        processing a decoder input for the time step using a decoder neural network, wherein the decoder input comprises at least a preceding token in the input question string and a preceding internal state of the decoder neural network, and wherein the decoder neural network is configured to, for each time step, process the decoder input to at least update an internal state of the decoder neural network;
        processing the respective encoded representations and a preceding output of the decoder neural network using a matching vector neural network, wherein the matching vector neural network is configured to receive the preceding output of the decoder neural network and the encoded representations and to process the preceding output and the encoded representations to generate a matching vector for the time step;
        processing the respective encoded representations and the preceding output of the decoder neural network using an attention vector neural network, wherein the attention vector neural network is configured to receive the preceding output of the decoder neural network and the encoded representations and to process the preceding output and the encoded representations to generate an attention vector for the time step, wherein the attention vector includes a respective value for each passage token; and generating an answer score that indicates how well the input text passage answers a question posed by the input question string based at least on the matching vectors for the time steps.

2. The method of claim 1, wherein the attention vector has the same dimensionality as the matching vector.

3. The method of claim 2, wherein the attention vector neural network has the same neural network architecture as the matching vector neural network but different parameter values.

4. The method of claim 1, wherein at each time step the decoder input further comprises the attention vector for the time step.

5. The method of claim 1, wherein generating the answer score comprises generating a matching vector score by determining an average or a weighted average of the entries of the matching vectors for the time steps.

6. The method of claim 5, wherein the decoder neural network is further configured to, at each time step, generate a set of question token scores that includes a respective score for each question token in a vocabulary of possible question tokens.

7. The method of claim 6, wherein generating the answer score comprises:
determining a perplexity score from an average perplexity of the question tokens in the input question string as reflected by the question token scores generated by the decoder neural network for the question tokens in the input question string; and
combining the perplexity score and the matching vector score to generate the answer score.

8. The method of claim 1, wherein the encoder neural network and the decoder neural network are recurrent neural networks.

9. The method of claim 1, wherein the preceding output is an output of one of the layers of the decoder neural network at a preceding time step.

10. The method of claim 1, further comprising:
determining, based on the answer score, that the input passage answers the question posed by the input passage string; and
in response, outputting data derived from the input passage.

11. A system comprising one or more computers and one or more storage devices storing instructions that when executed by the one or more computers cause the one or more computers to perform operations comprising:
receiving (i) an input text passage comprising a plurality of passage tokens and (ii) an input question string comprising a respective question token at each of a plurality of time steps;
processing the input text passage using an encoder neural network, wherein the encoder neural network is configured to receive the input text passage and to process the input text passage to generate a respective encoded representation for each passage token in the input text passage;
at each time step:
processing a decoder input for the time step using a decoder neural network, wherein the decoder input comprises at least a preceding token in the input question string and a preceding internal state of the decoder neural network, and wherein the decoder neural network is configured to, for each time step, process the decoder input to at least update an internal state of the decoder neural network;
processing the respective encoded representations and a preceding output of the decoder neural network using a matching vector neural network, wherein the matching vector neural network is configured to receive the preceding output of the decoder neural network and the encoded representations and to process the preceding output and the encoded representations to generate a matching vector for the time step;
processing the respective encoded representations and the preceding output of the decoder neural network using an attention vector neural network, wherein the attention vector neural network is configured to receive the preceding output of the decoder neural network and the encoded representations and to process the preceding output and the encoded representations to generate an attention vector for the time step, wherein the attention vector includes a respective value for each passage token; and
generating an answer score that indicates how well the input text passage answers a question posed by the input question string based at least on the matching vectors for the time steps.

12. The system of claim 11, wherein the attention vector has the same dimensionality as the matching vector.

13. The system of claim 12, wherein the attention vector neural network has the same neural network architecture as the matching vector neural network but different parameter values.

14. The system of claim 11, wherein at each time step the decoder input further comprises the attention vector for the time step.

15. The system of claim 11, wherein generating the answer score comprises generating a matching vector score by determining an average or a weighted average of the entries of the matching vectors for the time steps.

16. The system of claim 15, wherein the decoder neural network is further configured to, at each time step, generate a set of question token scores that includes a respective score for each question token in a vocabulary of possible question tokens.

17. The system of claim 16, wherein generating the answer score comprises:
determining a perplexity score from an average perplexity of the question tokens in the input question string as reflected by the question token scores generated by the decoder neural network for the question tokens in the input question string; and
combining the perplexity score and the matching vector score to generate the answer score.

18. One or more non-transitory computer readable media storing instructions that when executed by one or more computers cause the one or more computers to perform operations comprising:
receiving (i) an input text passage comprising a plurality of passage tokens and (ii) an input question string comprising a respective question token at each of a plurality of time steps;
processing the input text passage using an encoder neural network, wherein the encoder neural network is configured to receive the input text passage and to process the input text passage to generate a respective encoded representation for each passage token in the input text passage;

at each time step:

processing a decoder input for the time step using a decoder neural network, wherein the decoder input comprises at least a preceding token in the input question string and a preceding internal state of the decoder neural network, and wherein the decoder neural network is configured to, for each time step, process the decoder input to at least update an internal state of the decoder neural network;

processing the respective encoded representations and a preceding output of the decoder neural network using a matching vector neural network, wherein the matching vector neural network is configured to receive the preceding output of the decoder neural network and the encoded representations and to process the preceding output and the encoded representations to generate a matching vector for the time step;

processing the respective encoded representations and the preceding output of the decoder neural network using an attention vector neural network, wherein the attention vector neural network is configured to receive the preceding output of the decoder neural network and the encoded representations and to process the preceding output and the encoded representations to generate an attention vector for the time step, wherein the attention vector includes a respective value for each passage token; and generating an answer score that indicates how well the input text passage answers a question posed by the input question string based at least on the matching vectors for the time steps.

* * * * *